United States Patent
Suzuki

(10) Patent No.: US 12,460,073 B2
(45) Date of Patent: Nov. 4, 2025

(54) CURABLE RESIN COMPOSITION, FUEL CELL, AND SEALING METHOD

(71) Applicant: THREEBOND CO., LTD., Tokyo (JP)

(72) Inventor: Nao Suzuki, Tokyo (JP)

(73) Assignee: THREEBOND CO., LTD., Tokyo (JP)

( * ) Notice: Subject to any disclaimer, the term of this patent is extended or adjusted under 35 U.S.C. 154(b) by 529 days.

(21) Appl. No.: 18/042,555

(22) PCT Filed: Jul. 14, 2021

(86) PCT No.: PCT/JP2021/026456
§ 371 (c)(1),
(2) Date: Feb. 22, 2023

(87) PCT Pub. No.: WO2022/044596
PCT Pub. Date: Mar. 3, 2022

(65) Prior Publication Data
US 2023/0340247 A1 Oct. 26, 2023

(30) Foreign Application Priority Data
Aug. 31, 2020 (JP) .................................. 2020-146349

(51) Int. Cl.
*H01M 8/0284* (2016.01)
*C08K 5/14* (2006.01)
(Continued)

(52) U.S. Cl.
CPC ................ *C08L 23/22* (2013.01); *C08K 5/14* (2013.01); *C08K 5/5415* (2013.01); *H01M 8/0284* (2013.01); *C08L 2203/20* (2013.01)

(58) Field of Classification Search
CPC ....... C08L 23/22; C08L 2203/20; C08K 5/14; C08K 5/5415; H01M 8/0284;
(Continued)

(56) References Cited

U.S. PATENT DOCUMENTS

| 5,171,760 A | 12/1992 | Kaszas et al. |
| 6,136,896 A | 10/2000 | Lee et al. |

(Continued)

FOREIGN PATENT DOCUMENTS

| EP | 3330305 A1 | 6/2018 |
| JP | H02-88614 A | 3/1990 |

(Continued)

OTHER PUBLICATIONS

Office Action dated, Apr. 17, 2024 for the corresponding Chinese Patent Application No. 202180050950.3, with English translation, 14 pages.

(Continued)

*Primary Examiner* — Helen Oi K Conley
(74) *Attorney, Agent, or Firm* — LUCAS & MERCANTI, LLP

(57) ABSTRACT

A curable resin composition that is compatible with application by screen printing while maintaining cured product properties of high strength and high elongation. A curable resin composition contains the following (A) to (C) components: (A) component: a polyisobutylene resin containing one or more (meth)acryloyl groups and a —[$CH_2C(CH_3)_2$]— unit; (B) component: a radical polymerization initiator; and (C) component: an antifoaming agent containing a silicone compound having none of a methoxysilyl group, an ethoxysilyl group, and a (meth)acryloyl group and not containing an organic solvent.

15 Claims, 1 Drawing Sheet

(51) Int. Cl.
  *C08K 5/5415* (2006.01)
  *C08L 23/22* (2006.01)

(58) Field of Classification Search
  CPC ....... H01M 8/0286; H01M 2008/1095; H01M 8/0273; H01M 8/1004; C08F 290/042; F16J 15/102; F16J 15/14; Y02E 60/50
  See application file for complete search history.

(56) References Cited

U.S. PATENT DOCUMENTS

| | | | |
|---|---|---|---|
| 6,592,973 | B1 | 7/2003 | Nakata et al. |
| 2018/0226664 | A1 | 8/2018 | Soga et al. |
| 2020/0157270 | A1 | 5/2020 | Soga |

FOREIGN PATENT DOCUMENTS

| | | |
|---|---|---|
| JP | H07-181625 A | 7/1995 |
| JP | H11-002914 A | 1/1999 |
| JP | 2000-186123 A | 7/2000 |
| JP | 2001072960 A | 3/2001 |
| JP | 2005-171074 A | 6/2005 |
| JP | 2007-314715 A | 12/2007 |
| JP | 2009-117314 A | 5/2009 |
| WO | 2017/018547 A1 | 2/2017 |
| WO | 2018/190421 A1 | 10/2018 |

OTHER PUBLICATIONS

Office Action, dated Jul. 8, 2025, which was issued for the corresponding Japanese Patent Application No. 2022-545524, 6 pages, with English translation.

Office Action, dated Apr. 30, 2025, which was issued for the corresponding Japanese Patent Application No. 2022-545524, 6 pages, with English translation.

International Search Report dated Sep. 28, 2021 for the corresponding application No. PCT/JP2021/026456, with English translation.

Extended European Search Report, dated Feb. 28, 2025, issued for the corresponding European Patent Application No. 21861025.1, 8 pages.

CURABLE RESIN COMPOSITION, FUEL CELL, AND SEALING METHOD

CROSS REFERENCE TO RELATED APPLICATION

This Application is a 371 of PCT/JP2021/026456 filed on Jul. 14, 2021 which, in turn, claimed the priority of Japanese Patent Application No. 2020-146349 filed on Aug. 31, 2020, both applications are incorporated herein by reference.

TECHNICAL FIELD

The present invention relates to a curable resin composition, a fuel cell, and a sealing method.

BACKGROUND ART

In recent years, a fuel cell has attracted attention as a new energy system for an automobile and a home. A fuel cell is a power generator that produces electricity by chemically reacting hydrogen and oxygen. In addition, a fuel cell is a clean next-generation power generator because the fuel cell has high energy efficiency during power generation and generates water through the reaction of hydrogen and oxygen. There are four types of fuel cells: a polymer electrolyte fuel cell, a phosphoric acid fuel cell, a fused carbonate fuel cell, and a solid oxide fuel cell, and among these, the polymer electrolyte fuel cell has a relatively low operating temperature (around 80° C.) but high power generation efficiency and thus is expected in a use such as a power source for an automobile, a power generator for a home, a compact power source for an electronic device such as a cellphone, or an emergency power source.

As shown in FIG. 1, a cell 1 of a polymer electrolyte fuel cell has a structure including an electrolyte membrane electrode assembly (MEA) 5 having a structure in which a polymer electrolyte membrane 4 is sandwiched between an air electrode (cathode electrode) 3a and a fuel electrode (anode electrode) 3b, a frame 6 that supports the MEA, and a separator 2 in which a gas flow path is formed.

In order to start up the polymer electrolyte fuel cell, it is necessary to separately supply a hydrogen-containing fuel gas to the anode electrode and an oxygen-containing oxidation gas to the cathode electrode with these gases isolated from each other. This is because if the isolation is insufficient and one gas mixes with the other gas, the power generation efficiency may decrease. Against this background, a sealing agent is often used for the purpose of preventing leakage of a fuel gas, an oxidation gas, or the like. Specifically, a sealing agent is used between adjacent separators, between a separator and a frame, between a frame and an electrolyte membrane or an MEA, or the like.

As a sealing agent used in a polymer electrolyte fuel cell, a polymer composition using a polyisobutylene-based polymer is used because it is a rubber elastic body having excellent gas permeability resistance, low moisture permeability, heat resistance, and acid resistance. Specifically, Patent Literature 1 discloses a polymer composition that contains a telechelic polyisobutylene polymer having a terminal acrylate group and a reactive diluent and that exhibits excellent cured product properties of high strength and high elongation.

CITATION LIST

Patent Literature

[Patent Literature 1] Japanese Patent Laid-Open No. 2-88614

SUMMARY OF INVENTION

Technical Problem

In recent years, there has been a demand for further shortening of the tact time in the step of applying and curing a sealing agent at a production site. Specifically, from the viewpoint of productivity, there has been a demand for compatibility with screen printing (see Japanese Patent Laid-Open No. 2009-117314). However, the polymer composition of Patent Literature 1 uses a high-molecular-weight polymer in order to improve cured product properties such as high strength and high elongation, and thus repellence occurs from the adherend when the polymer composition is applied by screen printing, or it is difficult to eliminate an air bubble generated by screen printing, and the polymer composition is not suitable for screen printing.

The present invention has been made in view of the above circumstances, and the purpose of the present invention is to provide a curable resin composition that is compatible with application by screen printing while maintaining cured product properties of high strength and high elongation.

Means for Solving Problem

Next, a summary of the present invention will be described.

[1] A curable resin composition comprising the following (A) to (C) components:
(A) component: a polyisobutylene resin comprising one or more (meth)acryloyl groups and a $-[CH_2C(CH_3)_2]-$ unit
(B) component: a radical polymerization initiator
(C) component: an antifoaming agent comprising a silicone compound having none of a methoxysilyl group, an ethoxysilyl group, and a (meth)acryloyl group and not comprising an organic solvent.

[2] The curable resin composition according to [1], wherein the (A) component is a polyisobutylene resin represented by a general formula (1):

[Formula 1]

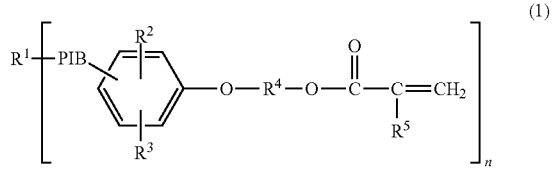

wherein $R^1$ represents a monovalent or polyvalent aromatic hydrocarbon group or a monovalent or polyvalent aliphatic hydrocarbon group optionally having an aromatic ring, PIB represents a polyisobutylene skeleton comprising the $-[CH_2C(CH_3)_2]-$ unit, $R^4$ represents a divalent hydrocarbon group having 2 to 6 carbon atoms optionally containing an oxygen atom, $R^2$ and $R^3$ each independently represent a hydrogen atom or a monovalent hydrocarbon group having 1 to 20 carbon atoms, $R^5$ represents a hydrogen atom, a methyl group, or an ethyl group, and n is any integer of 1 to 6.

[3] The curable resin composition according to [1] or [2], wherein the curable resin composition comprises 0.1 to 10 parts by mass of the (C) component per 100 parts by mass of the (A) component.

[4] The curable resin composition according to any one of [1] to [3], wherein the curable resin composition further comprises a monofunctional monomer as a (D) component.

[5] The curable resin composition according to any one of [1] to [4], wherein the curable resin composition does not comprise an organic solvent.

[6] The curable resin composition according to any one of [1] to [5], wherein the silicone compound in the (C) component is a compound having a structure of any of dimethylsiloxane, methylphenylsiloxane, or diphenylsiloxane.

[7] The curable resin composition according to any one of [4] to [6], wherein the curable resin composition comprises 0.1 to 9 parts by mass of the (C) component per 100 parts by mass in total of the (A) component and the (D) component.

[8] The curable resin composition according to any one of [1] to [7], wherein the (B) component is a radical photopolymerization initiator or an organic peroxide.

[9] A curable sealing agent for a fuel cell, comprising the curable resin composition according to any of [1] to [8].

[10] The curable sealing agent for a fuel cell according to [9], wherein the curable sealing agent for a fuel cell is used for any member selected from the group consisting of a separator, a frame, an electrolyte membrane, a fuel electrode, an air electrode, and an electrolyte membrane electrode assembly, which are members of a fuel cell.

[11] A cured product of the curable resin composition according to any of [1] to [8].

[12] A fuel cell comprising any seal selected from the group consisting of a seal between adjacent separators in a fuel cell and a seal between a frame of a fuel cell and an electrolyte membrane or an electrolyte membrane electrode assembly, wherein the any seal is the cured product according to [11].

[13] A sealing method for sealing at least a portion between at least two flanges of a part to be sealed having the at least two flanges, wherein at least one of the flanges is permeable to an active energy ray, the sealing method comprising: a step of applying the curable resin composition according to any one of [1] to [8] to a surface of at least one of the flanges; a step of bonding the one flange to which the curable resin composition is applied and another flange together via the curable resin composition; and a step of irradiating the curable resin composition with an active energy ray through the flange that is permeable to the active energy ray to cure the curable resin composition to seal at least a portion between the at least two flanges.

[14] A sealing method for sealing at least a portion between at least two flanges of a part to be sealed having the at least two flanges, the sealing method comprising: a step of applying the curable resin composition according to any one of [1] to [8] to at least one flange of the flanges; a step of irradiating the applied curable resin composition with an active energy ray to cure the curable resin composition to form a gasket made of a cured product of the curable resin composition; and a step of disposing another flange on the gasket and crimping the one flange to which the curable resin composition is applied and the another flange via the gasket to seal at least a portion between the at least two flanges.

[15] A sealing method for sealing at least a portion between at least two flanges of a part to be sealed having the at least two flanges, the sealing method comprising: a step of disposing a mold for gasket formation on at least one flange of the flanges; a step of injecting the curable resin composition according to any of [1] to [8] into at least a portion of a gap between the mold for gasket formation and the one flange on which the mold is disposed; a step of irradiating the curable resin composition with an active energy ray to cure the curable resin composition to form a gasket made of a cured product of the curable resin composition; a step of removing the mold from the one flange; and a step of disposing another flange on the gasket and crimping the one flange and the another flange via the gasket to seal at least a portion between the at least two flanges.

Advantageous Effect of the Invention

The present invention provides a curable resin composition that is compatible with application by screen printing while maintaining cured product properties of high strength and high elongation.

DESCRIPTION OF EMBODIMENTS

Figure 1:
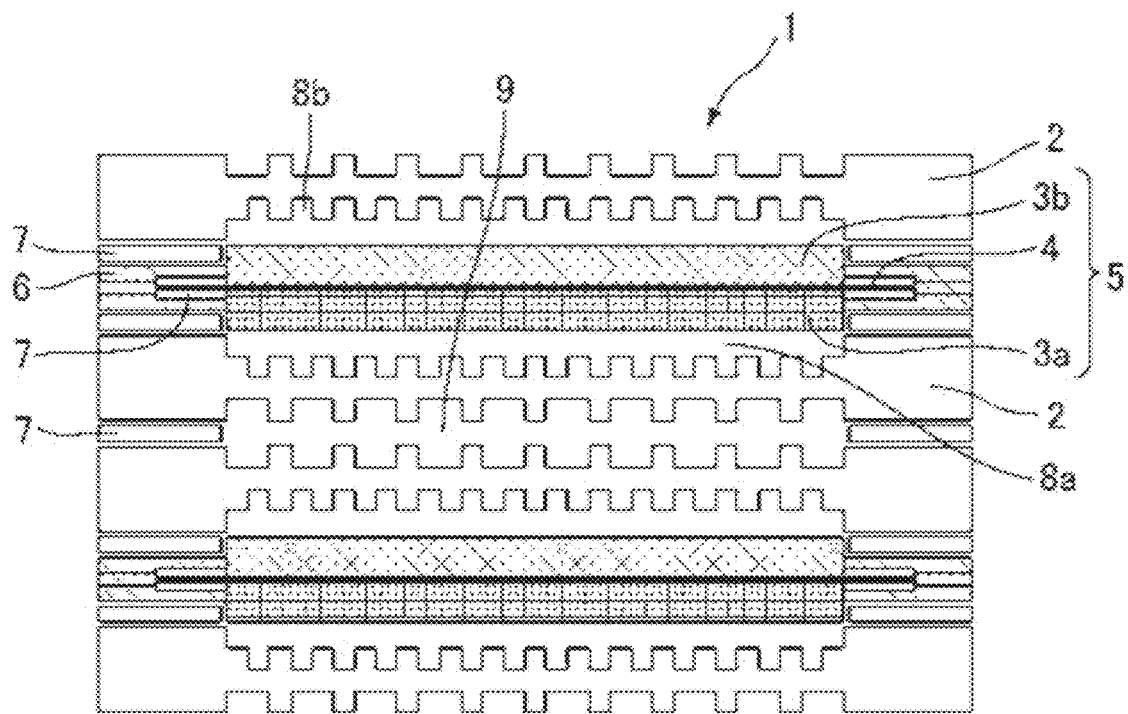
FIG. 1 is a schematic cross-sectional view of a single cell of a fuel cell.

Hereinafter, details of the present invention will be described. As used herein, "X to Y" is used in a sense that includes the numerical values (X and Y) written before and after the word "to" as the lower limit value and the upper limit value, respectively, and means "X or more and Y or less." In addition, in the present invention, (meth)acrylate means both acrylate and methacrylate.

The curable resin composition of the present invention includes (A) component: a polyisobutylene resin containing one or more (meth)acryloyl groups and a —[CH$_2$C(CH$_3$)$_2$]— unit, (B) component: a radical polymerization initiator, and (C) component: an antifoaming agent containing a silicone compound having none of a methoxysilyl group, an ethoxysilyl group, and a (meth)acryloyl group and not containing an organic solvent. According to the present invention, a curable resin composition having high strength and high elongation and suitable for screen printing is provided. The term "suitable for screen printing" means having properties such as no occurrence of repellence from an adherend during application by screen printing and no occurrence of an air bubble due to screen printing.

<(A) Component>

The (A) component used in the present invention is not particularly limited as long as it is a polymer having a polyisobutylene skeleton containing one or more (meth)acryloyl groups and an —[CH$_2$C(CH$_3$)$_2$]— unit. The (A) component may have, for example, a —[CH$_2$C(CH$_3$)$_2$]— unit (polyisobutylene skeleton), and may be a polymer further containing a "different constitutional unit other than the —[CH$_2$C(CH$_3$)$_2$]—unit." The (A) component appropriately contains a —[CH$_2$C(CH$_3$)$_2$]— unit in an amount of, for example, 70% by mass or more, preferably 75% by mass or more, and more preferably 80% by mass or more, based on the total amount of constitutional units. In addition, the (A) component appropriately contains a —[CH$_2$C(CH$_3$)$_2$]— unit in an amount of, for example, 100% by mass or less, in another embodiment, 95% by mass or less, and in yet another embodiment, 90% by mass or less. The (A) component appropriately has preferably 1 to 12 (meth)acryloyl groups, more preferably 2 to 8 (meth)acryloyl groups, further preferably 2 to 4 (meth)acryloyl groups, and particularly preferably 2 (meth)acryloyl groups. In the present invention, without being bound by theory, the "polymer" can be defined as, for example, a compound having a structure with a repeating unit of a monomer in the main chain of the polymer and consisting of 100 or more repeating units. In addition, the (meth)acryloyl group may be present on either of a side chain and/or a terminal of the molecule, and is preferably present on a terminal of the molecule from the viewpoint of rubber elasticity.

The (A) component is preferably a polymer having a polyisobutylene skeleton represented by the general formula (1) from the viewpoint of obtaining a curable resin composition exhibiting excellent cured product properties of high strength and high elongation. Specific examples of the (A) component include a polyisobutylene having a (meth)acryloyloxyalkoxyphenyl group. The main skeleton of the (A) component in the present invention is a polyisobutylene skeleton, and as a monomer constituting this polyisobutylene skeleton, isobutylene is mainly used, and another monomer may be copolymerized as long as it does not impair the effects of the present invention. The (A) component is preferably liquid at normal temperature (25° C.) from the viewpoint of obtaining a curable resin composition that is much more compatible with application by screen printing.

[Formula 2]

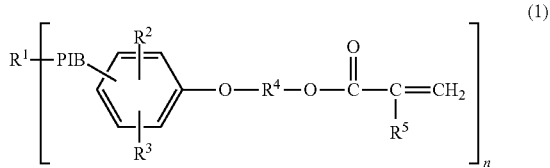

(1)

wherein R$^1$ represents a monovalent or polyvalent aromatic hydrocarbon group or a monovalent or polyvalent aliphatic hydrocarbon group optionally having an aromatic ring. The monovalent or polyvalent aromatic hydrocarbon group is preferably an aryl group having 6 to 18 carbon atoms or an arylene group having 6 to 18 carbon atoms. Specific examples of the monovalent or polyvalent aromatic hydrocarbon group include a phenyl group, a phenylene group, a naphthyl group, a naphthylene group, a biphenyl group, a tolyl group, a tolylene group, a xylyl group, and a xylylene group. The monovalent or polyvalent aliphatic hydrocarbon group optionally having an aromatic ring is an alkyl group having 6 to 18 carbon atoms, an alkylene group having 6 to 18 carbon atoms, an arylalkyl group having 6 to 18 carbon atoms, or an alkylenearylenealkylene group having 6 to 18 carbon atoms. Specific examples of the monovalent or polyvalent aliphatic hydrocarbon group optionally having an aromatic ring include a —C(CH$_3$)$_2$CH$_2$C(CH$_3$)$_2$CH$_3$ group, a —C(CH$_3$)$_2$CH$_2$C(CH$_3$)$_2$CH$_2$C(CH$_3$)$_2$— group, and a group represented by a —C(CH$_3$)$_2$—C$_6$H$_4$—C(CH$_3$)$_2$— group (dicumyl group). Among these, a polyvalent aromatic hydrocarbon group or an aliphatic hydrocarbon group optionally having an aromatic ring is preferable, a divalent group is particularly preferable, and for example, a phenylene group or a dicumyl group (more preferably p-dicumyl group) is preferable.

PIB represents a polyisobutylene skeleton containing a —[CH$_2$C(CH$_3$)$_2$]— unit.

R$^4$ represents a divalent hydrocarbon group having 2 to 6 carbon atoms optionally containing an oxygen atom, and is preferably a divalent hydrocarbon group having 2 or 3 carbon atoms. Preferable examples of the divalent saturated hydrocarbon group having 2 to 6 carbon atoms optionally containing an oxygen atom include —CH$_2$CH$_2$—, —CH$_2$CH$_2$CH$_2$—, —CH$_2$CH$_2$CH$_2$CH$_2$—, —CH$_2$CH$_2$CH$_2$CH$_2$CH$_2$—, —C(CH$_3$)$_2$CH$_2$C(CH$_3$)$_2$CH$_2$—, —CH$_2$CH$_2$—O—CH$_2$CH$_2$—, and —CH$_2$CH(OH)CH$_2$—. Among these, —CH$_2$CH$_2$— is preferable.

R$^2$ and R$^3$ each independently represent a hydrogen atom or a monovalent hydrocarbon group having 1 to 20 carbon atoms, and are each independently preferably a hydrogen atom. R$^5$ represents a hydrogen atom, a methyl group, or an ethyl group, and is preferably a hydrogen atom or a methyl group. n is any integer of 1 to 6, and particularly preferably an integer of 2 to 4.

The molecular weight of the (A) component in the present invention is not particularly limited, and the number average molecular weight obtained by chromatographic measurement is, for example, preferably 200 to 500,000, further preferably 1,000 to 100,000, and particularly preferably 3,000 to 50,000, from the viewpoint of being compatible with application by screen printing and having an excellent sealing property. The number average molecular weight was calculated by a standard polystyrene conversion method using size exclusion chromatography (SEC).

The viscosity at 25° C. of the (A) component in the present invention is not particularly limited, and is, for example, 5 Pa·s or more, preferably 50 Pa·s or more, more preferably 100 Pa·s or more, further preferably 500 Pa·s or more, particularly preferably 1000 Pa·s or more, and, for example, 3000 Pa·s or less, preferably 2500 Pa·s or less, more preferably 2000 Pa·s or less, from the viewpoint of workability and the like. A particularly preferable viscosity is 1800 Pa·s or less. Unless otherwise specified, viscosity measurement was carried out using a cone-plate type viscometer, and viscosity at 25° C. was measured.

The method for producing the (A) component is not particularly limited, and a known method can be used. Examples thereof include methods for obtaining the same by reacting a hydroxyl group-terminated polyisobutylene with acryloyl chloride or methacryloyl chloride, disclosed in Polymer Bulletin, Vol. 6, pp. 135-141 (1981), T. P. Liao and J. P. Kennedy, and Polymer Bulletin, Vol. 20, pp. 253-260 (1988), Puskas et al. In addition, other examples of the method for producing the (A) component include a method for obtaining the same by reacting a hydroxyl group-terminated polyisobutylene with a compound having a (meth)acryloyl group and an isocyanate group; a method for obtaining the same by reacting a hydroxyl group-terminated polyisobutylene with a compound having an isocyanate group and a compound having a (meth)acryloyl group and a hydroxyl group; and a method for obtaining the same by reacting a hydroxyl group-terminated polyisobutylene with (meth)acrylic acid or a lower ester of (meth)acrylic acid using a dehydration esterification method or an ester exchange method.

The method for producing the polyisobutylene represented by the general formula (1) is not particularly limited, and preferable examples thereof include a method involving reacting the halogen-terminated polyisobutylene disclosed in Japanese Patent Laid-Open No. 2013-216782 with a compound having a (meth)acryloyl group and a phenoxy group as represented by the general formula (2). In addition, the halogen-terminated polyisobutylene can be obtained by a known method, and can be obtained, for example, by cationic polymerization and more preferably by living cationic polymerization.

[Formula 3]

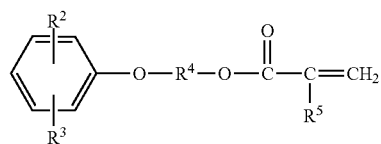

(2)

wherein $R^2$, $R^3$, $R^4$, and $R^5$ may be as defined in the above general formula (1). Specifically, $R^4$ represents a divalent hydrocarbon group having 2 to 6 carbon atoms and optionally containing an oxygen atom. $R^2$ and $R^3$ each independently represent a hydrogen atom or a monovalent hydrocarbon group having 1 to 20 carbon atoms. $R^5$ represents a hydrogen atom, a methyl group, or an ethyl group. Examples of the compound represented by the above general formula (2) include phenoxymethyl (meth)acrylate, phenoxyethyl(meth) acrylate, phenoxypropyl (meth)acrylate, phenoxybutyl (meth)acrylate, and phenoxypentyl (meth)acrylate, and preferable examples include phenoxyethyl (meth)acrylate, phenoxypropyl (meth)acrylate, phenoxybutyl (meth)acrylate, and phenoxypentyl(meth) acrylate.

<(B) Component>

The (B) component that can be used in the present invention is a radical polymerization initiator. Examples of the (B) component include a radical photopolymerization initiator and an organic peroxide (thermal radical polymerization initiator). The curing form of the radical curable resin composition of the present invention can be selected from photo-curing, heat curing, or redox curing by selecting the (B) component of the present invention. For example, if "photocurability" is to be imparted to the radical curable resin composition, a radical photopolymerization initiator may be selected, and if "curing by heating or curing by a redox reaction" is to be imparted thereto, an organic peroxide may be selected.

The amount of the (B) component of the present invention blended is not particularly limited, and is, for example, 0.1 to 30 parts by mass, preferably 0.5 to 20 parts by mass, more preferably 0.3 to 18 parts by mass, further preferably 1 to 15 parts by mass, and particularly preferably 1.5 to 10 parts by mass, per 100 parts by mass of the (A) component. It is preferable for the amount to be within the above range from the viewpoint of being able to have cured product properties of high strength and high elongation.

The radical photopolymerization initiator, which is one (B) component that can be used in the present invention, is not limited as long as it is a compound that generates a radical upon irradiation with light (active energy ray). Here, the active energy ray includes all light in a broad sense such as a radiation such as an α ray or a β ray, an electromagnetic wave such as a γ ray or an X ray, an electron beam (EB), an ultraviolet ray having a wavelength of about 100 to 400 nm, and a visible ray having a wavelength of about 400 to 800 nm, and is preferably an ultraviolet ray. Examples of the radical photopolymerization initiator as the (B) component include an acetophenone-based radical photopolymerization initiator, a benzoin-based radical photopolymerization initiator, a benzophenone-based radical photopolymerization initiator, a thioxanthone-based radical photopolymerization initiator, an acylphosphine oxide-based radical photopolymerization initiator, and a titanocene-based radical photopolymerization initiator, and among these, an acetophenone-based radical photopolymerization initiator and an acylphosphine oxide-based radical photopolymerization initiator are preferable from the viewpoint of obtaining a cured product having high strength and high elongation. In addition, these may be used singly or in combinations of two or more.

Examples of the acetophenone-based radical photopolymerization initiator include, but are not limited to, diethoxyacetophenone, 2-hydroxy-2-methyl-1-phenyl-propan-1-one, benzyl dimethyl ketal, 4-(2-hydroxyethoxy)phenyl-(2-hydroxy-2-propyl)ketone, 1-hydroxy-cyclohexyl-phenyl-ketone, 2-methyl-2-morpholino(4-thiomethylphenyl)propan-1-one, 2-benzyl-2-dimethylamino-1-(4-morpholinophenyl) butanone, and 2-hydroxy-2-methyl-1-[4-(1-methylvinyl) phenyl]propanone oligomer. Examples of a commercially available product of the acetophenone-based radical photopolymerization initiator include Omnirad ((R), hereinafter the same applies) 184, Omnirad 1173, Omnirad 2959, Omnirad 127, and ESACURE (R) KIP-150 (manufactured by IGM Resins B. V.).

Examples of the acylphosphine oxide-based radical photopolymerization initiator include, but are not limited to, bis(2,4,6-trimethylbenzoyl)-phenyl-phosphine oxide and 2,4,6-trimethylbenzoyl-diphenyl-phosphine oxide. Examples of a commercially available product of the acylphosphine oxide-based radical photopolymerization initiator include Omnirad TPO, Omnirad 819, and Omnirad 819DW (manufactured by IGM Resins B. V.).

The organic peroxide, which is one (B) component that can be used in the present invention, is a compound that generates a radical species upon heating or a redox reaction. Here, the heating is suitably carried out, for example, at a temperature of 50° C. or more, preferably at a temperature of 80° C. or more, and more preferably at a temperature of 100° C. or more. A compound that generates a radical species upon heating is also particularly referred to as a thermal radical polymerization initiator. The redox reaction is also referred to as an oxidation-reduction reaction, and is a phenomenon in which an oxidation-reduction reaction is caused by a radical species released from an organic peroxide. Use of a redox reaction is preferable because it can generate a radical species at room temperature. The organic peroxide as the (B) component is not particularly limited, and examples thereof include a ketone peroxide such as methyl ethyl ketone peroxide, cyclohexanone peroxide, 3,3,5-trimethylcyclohexanone peroxide, methylcyclohexanone peroxide, methyl acetoacetate peroxide, or acetylacetone peroxide; a peroxyketal such as 1,1-bis(t-butylperoxy)-3,3,5-trimethylcyclohexane, 1,1-bis(t-butylperoxy)cyclohexane, 2,2-bis(t-butylperoxy)octane, n-butyl-4,4-bis(t-butylperoxy)valerate, or 2,2-bis(t-butylperoxy)butane; a hydroperoxide such as t-butyl hydroperoxide, cumene hydroperoxide, diisopropylbenzene hydroperoxide, p-menthane hydroperoxide, 2,5-dimethylhexane-2,5-dihydroperoxide, or 1,1,3,3-tetramethylbutyl hydroperoxide; a dialkyl peroxide such as di-t-butyl peroxide, t-butylcumyl peroxide, dicumyl peroxide, α,α'-bis(t-butylperoxy-m-isopropyl)benzene, 2,5-dimethyl-2,5-di(t-butylperoxy)hexane, or 2,5-dimethyl-2,5-di(t-butylperoxy)hexyne-3; a diacyl peroxide such as acetyl peroxide, isobutyryl peroxide, octanoyl peroxide, decanoyl peroxide, lauroyl peroxide, 3,5,5-trimethylhexanoyl peroxide, succinic acid peroxide, benzoyl peroxide, 2,4-dichlorobenzoyl peroxide, or m-toluoyl peroxide; a peroxydicarbonate such as diisopropyl peroxydicarbonate, di-2-ethylhexyl peroxydicarbonate, di-n-propyl peroxydicarbonate, bis-(4-t-butylcyclohexyl) peroxydicarbonate, dimyristyl peroxydicarbonate, di-2-ethoxyethyl peroxydicarbonate, dimethoxyisopropyl peroxydicarbonate, di(3-methyl-3-methoxybutyl) peroxydicarbonate, or diallyl peroxydicarbonate; a peroxyester such as t-butyl peroxyacetate, t-butyl peroxyisobutyrate, t-butyl peroxypivalate, t-butyl peroxyneodecanoate, cumyl peroxyneodecanoate, t-butyl peroxy-2-ethylhexanoate, t-butyl peroxy-3,5,5-trimethylhexanoate, t-butyl peroxylaurate, t-butyl peroxybenzoate, di-t-butyl peroxyisophthalate, 2,5-dimethyl-2,5-di(benzoylperoxy)hexane, t-butyl peroxymaleic acid, t-butyl peroxyisopropyl carbonate, cumyl peroxyoctoate, t-hexyl peroxyneodecanoate, t-hexyl peroxypivalate, t-butyl peroxyneohexanoate, t-hexyl peroxyneohexanoate, or cumyl peroxyneohexanoate; and acetylcyclohexylsulfonyl peroxide and t-butyl peroxyallyl carbonate. These organic peroxides may be used singly, or a plurality thereof may be used in combination. Among these, cumene hydroperoxide is preferably used from the viewpoint of cured product properties of high strength and high elongation.

When an organic peroxide is used as the (B) component, a curing accelerator can be blended for the purpose of accelerating a redox reaction. Such a curing accelerator is not particularly limited, and preferable examples thereof that can be used include saccharin (o-benzoic sulfimide), a hydrazine compound, an amine compound, a mercaptan compound, and a transition metal-containing compound.

Examples of the hydrazine compound include 1-acetyl-2-phenylhydrazine, 1-acetyl-2(p-tolyl)hydrazine, 1-benzoyl-2-phenylhydrazine, 1-(1',1',1'-trifluoro)acetyl-2-phenylhydrazine, 1,5-diphenyl-carbohydrazine, 1-formyl-2-phenylhydrazine, 1-acetyl-2-(p-bromophenyl)hydrazine, 1-acetyl-2-(p-nitrophenyl)hydrazine, 1-acetyl-2-(2'-phenylethylhydrazine), ethylcarbazate, p-nitrophenylhydrazine, and p-trisulfonylhydrazide.

Examples of the amine compound include a heterocyclic secondary amine such as 2-ethylhexylamine, 1,2,3,4-tetrahydroquinone, or 1,2,3,4-tetrahydroquinaldine; a heterocyclic tertiary amine such as quinoline, methylquinoline, quinaldine, quinoxaline, or phenazine; an aromatic tertiary amine such as N,N-dimethyl-para-toluidine, N,N-dimethylanisidine, or N,N-dimethylaniline; and an azole-based compound such as 1,2,4-triazole, oxazole, oxadiazole, thiadiazole, benzotriazole, hydroxybenzotriazole, benzoxazole, 1,2,3-benzothiadiazole, or 3-mercaptobenzotriazole.

Examples of the mercaptan compound include n-dodecyl mercaptan, ethyl mercaptan, butyl mercaptan, tris-[(3-mercaptopropionyloxy)-ethyl]-isocyanurate, pentaerythritol tetrakis(3-mercaptopropionate), dipentaerythritol hexakis(3-mercaptopropionate), trimethylolpropane tris(3-mercaptopropionate), trimethylolpropane tristhioglycolate, and pentaerythritol tetrakisthioglycolate.

As the transition metal-containing compound, a metal chelate complex salt is preferably used. Examples thereof include pentadione iron, pentadione cobalt, pentadione copper, propylenediamine copper, ethylenediamine copper, iron naphthenate, nickel naphthenate, cobalt naphthenate, copper naphthenate, copper octanoate, iron hexanoate, iron propionate, and acetylacetone vanadium.

The above curing accelerators may be used singly, or a plurality thereof may be used in combination. Among these, a mixture of saccharin, a hydrazine-based compound, an amine-based compound, and a transition metal-containing compound is more preferable because the mixture exhibits a good curing acceleration effect.

<(C) Component>

The (C) component of the present invention is an antifoaming agent containing a silicone compound having none of a methoxysilyl group, an ethoxysilyl group, and a (meth)acryloyl group, and not containing an organic solvent. That is, the antifoaming agent does not contain an organic solvent and contains a silicone compound having none of a methoxysilyl group, an ethoxysilyl group, and a (meth)acryloyl group. The present invention has a remarkable effect of being able to provide a curable resin composition that is compatible with application by screen printing while maintaining cured product properties of high strength and high elongation, by selecting the (C) component of the present invention from among many antifoaming agents present and combining the (C) component with the other components of the present invention. Examples of the silicone compound include a compound containing —Si—O—Si— (siloxane bond), and more specific examples include a compound having a structure of dimethylsiloxane, methylphenylsiloxane, diphenylsiloxane, or the like. In addition, the silicone compound in the (C) component is a silicone compound having none of a methoxysilyl group, an ethoxysilyl group, and a (meth)acryloyl group at a terminal or a side chain in one molecule of the silicone compound and preferably a compound having at least one of the terminals capped with a trimethylsilyl group, from the viewpoint of small repellence when the curable resin composition is applied to an adherend by screen printing while maintaining the tensile strength of the cured product. In addition, the (C) component is characterized by not containing an organic solvent from the viewpoint of small repellence when the curable resin composition is applied to an adherend by screen printing while maintaining the tensile strength of the cured product. As used herein, the organic solvent means an organic compound that is liquid at 25° C., other than the silicone compound, the (B) component, and the (D) component, and examples thereof include propylene glycol and diisobutyl ketone. In addition, as will be described later, the curable resin composition according to the present invention preferably does not contain an organic solvent, and because of this as well, the (C) component does not contain an organic solvent.

The silicone compound contained in the (C) component preferably contains a dimethylpolysiloxane structure having a siloxane bond (Si—O—Si) and a methyl group. By containing a dimethylpolysiloxane structure in the silicone compound contained in the (C) component, the desired effect of the present invention can be more exerted, and a curable resin composition suitable for screen printing can be obtained.

The silicone compound contained in the (C) component is preferably silicone oil, which is a type of silicone compound. Therefore, the (C) component is preferably an oil-type antifoaming agent.

The viscosity at 25° C. of the silicone compound contained in the (C) component is preferably in the range of 1 to 500 mm$^2$/s, and more preferably in the range of 10 to 350 mm$^2$/s. When the viscosity at 25° C. of the silicone compound is in the above range, the effect as an antifoaming agent can be suitably exerted. In addition, the viscosity at 25° C. of the (C) component is also preferably in the range of 1 to 500 mm²/s, and more preferably in the range of 10 to 350 mm²/s, from the viewpoint of exerting the effect as an antifoaming agent.

In the (C) component, the silicone compound is preferably contained as a main component. As used herein, the main component means that the content thereof is 75% by mass or more based on the total mass of the (C) component. In addition, in the (C) component, the upper limit of the content of the silicone compound is 100% by mass based on the total mass of the (C) component. The content of the silicone compound in the (C) component is preferably 80% by mass or more, more preferably 90% by mass or more, and further preferably 95% by mass or more, based on the total mass of the antifoaming agent.

The (C) component may contain an additive as long as the additive does not impair a property of the antifoaming agent. Examples of the additive include a wax such as polyethylene wax, and hydrophobic silica. For example, the content of the additive in the (C) component is 25% by mass or less, preferably 20% by mass or less, more preferably 15% by mass or less, further preferably 10% by mass or less, and particularly preferably 5% by mass or less. The lower limit of the content of the additive in the (C) component is 0% by mass based on the total mass of the (C) component.

Examples of a commercially available product of the (C) component of the present invention include BYK-1799 (manufactured by BYK-Chemie GmbH) and KF-96 series (manufactured by Shin-Etsu Chemical Co., Ltd.).

The amount of (C) added is not particularly limited, and the content of the (C) component is, for example, in the range of 0.1 to 10 parts by mass, preferably in the range of 0.15 to 5 parts by mass, more preferably in the range of 0.15 to 4.5 parts by mass, further preferably in the range of 0.2 to 4 parts by mass, particularly preferably in the range of 0.2 to 3 parts by mass, and further preferably in the range of 0.5 to 2.5 parts by mass, per 100 parts by mass of the (A) component. In addition, the content of the (C) component is preferably in the range of 0.1 to 9 parts by mass, more preferably in the range of 0.2 to 7 parts by mass, further preferably in the range of 0.3 to 5 parts by mass, particularly preferably in the range of 0.3 to 3 parts by mass, and most preferably in the range of 0.3 to 1.5 parts by mass, per 100 parts by mass in total of the (A) component and the (D) component described later. Within the above range, it is possible to obtain a curable resin composition that is much more compatible with application by screen printing while maintaining cured product properties of high strength and high elongation.

<(D) Component>

Further, the curable resin composition of the present invention can further contain a monofunctional monomer as a (D) component. The (D) component, when combined with other components (components (A) to (C)) of the present invention, is much more compatible with application by screen printing, and can maintain cured product properties. Examples of the (D) component include a (meth)acrylate monomer having an alkyl group having 5 to 30 carbon atoms or a (meth)acrylate monomer having an alicyclic hydrocarbon group having 5 to 30 carbon atoms. Among these, a (meth)acrylate monomer having an alkyl group having 5 to 30 carbon atoms and a (meth)acrylate monomer having an alicyclic hydrocarbon group having 5 to 30 carbon atoms are particularly preferably used in combination from the viewpoint of being much more compatible with application by screen printing and being able to maintain cured product properties.

Examples of the (meth)acrylate monomer having an alkyl group having 5 to 30 carbon atoms include 2-ethylhexyl (meth)acrylate, octyl (meth)acrylate, isooctyl (meth)acrylate, decyl (meth)acrylate, dodecyl (meth)acrylate, isodecyl (meth)acrylate, lauryl (meth)acrylate, n-octadecyl (meth)acrylate, isooctadecyl (meth)acrylate, nonadecane(meth)acrylate, isostearyl (meth)acrylate, and stearyl (meth)acrylate, and among these, preferable examples include 2-ethylhexyl (meth)acrylate, isooctyl (meth)acrylate, isodecyl (meth)acrylate, lauryl (meth)acrylate, isooctadecyl (meth)acrylate, isostearyl (meth)acrylate, and stearyl (meth) acrylate. The (meth)acrylate monomer having an alkyl group having 5 to 30 carbon atoms is preferably a (meth)acrylate monomer having an alkyl group having 6 to 20 carbon atoms, and preferably a (meth)acrylate monomer having an alkyl group having 8 to 20 carbon atoms. Such (D) components can be used singly or as a mixture of two or more. A commercially available product of the (meth)acrylate monomer having an alkyl group having 5 to 30 carbon atoms is not particularly limited, and examples thereof include SR335, SR395, SR440, SR489D, SR313, SR324, and SR493D (manufactured by Sartomer), and S-1800A (manufactured by SHIN-NAKAMURA CHEMICAL Co., Ltd.).

In addition, examples of the (meth)acrylate monomer having an alicyclic hydrocarbon group having 5 to 30 carbon atoms include cyclohexyl (meth)acrylate, trimethylcyclohexyl(meth)acrylate, t-butylcyclohexyl(meth)acrylate, dicyclopentanyl(meth)acrylate, dicyclopentenyl(meth) acrylate, dicyclopentenyloxy(meth) acrylate, isobornyl (meth)acrylate, adamantyl (meth)acrylate, and dicyclopentenyl di(meth)acrylate. Among these, trimethylcyclohexyl(meth) acrylate, t-butylcyclohexyl(meth) acrylate, dicyclopentanyl (meth) acrylate, dicyclopentenyl(meth)acrylate, dicyclopentenyloxy(meth)acrylate, and isobornyl (meth) acrylate are preferable. These can be used singly or as a mixture of two or more. The (meth)acrylate monomer having an alicyclic hydrocarbon group having 5 to 30 carbon atoms is preferably a (meth)acrylate monomer having an alicyclic hydrocarbon group having 6 to 20 carbon atoms, and preferably a (meth)acrylate monomer having an alicyclic hydrocarbon group having 8 to 20 carbon atoms. A commercially available product of the (meth)acrylate monomer having an alicyclic hydrocarbon group having 5 to 30 carbon atoms is not particularly limited, and examples thereof include SR506 and SR423 (both manufactured by Sartomer), IBX and IBX-A (both manufactured by Kyoeisha Chemical Co., Ltd.), and FA-511AS, FA-512AS, FA-513AS, FA-512M, FA-512MT, and FA-513M (all manufactured by Showa Denko Materials Co., Ltd.).

The amount of the (D) component blended is preferably 5 to 500 parts by mass, more preferably in the range of 10 to 300 parts by mass, further preferably in the range of 12 to 200 parts by mass, particularly preferably in the range of 30 to 150 parts by mass, and most preferably in the range of 40 to 100 parts by mass, per 100 parts by mass of the (A) component. Within the above range, it is possible to provide a curable resin composition that is much more compatible with application by screen printing and can be photocured in a short time. In addition, when two or more (D) components are combined, the total amount thereof is regarded as the content of the (D) component. In addition, when a (meth)acrylate monomer having an alkyl group having 5 to 30 carbon atoms and a (meth)acrylate monomer having an alicyclic hydrocarbon group having 5 to 30 carbon atoms are used in combination, the mass ratio (x:y) between the (meth)acrylate monomer having an alkyl group having 5 to 30 carbon atoms (x) and the (meth)acrylate monomer having an alicyclic hydrocarbon group having 5 to 30 carbon atoms (y) is, for example, in the range of 1:99 to 99:1, preferably 10:90 to 90:10, and particularly preferably in the range of 15:85 to 85:15.

<Optional Component>

To the curable resin composition of the present invention, an additive such as an oligomer or a polymer having a (meth)acryloyl group (not containing the (A) component of the present invention), an inorganic filler, a curing accelerator, a storage stabilizer, an antioxidant, a light stabilizer, a plasticizer, a pigment, a flame retardant, or a surfactant can be added as long as the object of the present invention is not impaired.

The oligomer or polymer having a (meth)acryloyl group (not containing the (A) component of the present invention) is not particularly limited, and examples thereof include a urethane (meth)acrylate having a polybutadiene skeleton, a urethane (meth)acrylate having a hydrogenated polybutadiene skeleton, a urethane (meth)acrylate having a polycarbonate skeleton, a urethane (meth)acrylate having a polyether skeleton, a urethane (meth)acrylate having a polyester skeleton, a urethane (meth)acrylate having a castor oil skeleton, an isoprene-based(meth)acrylate, a hydrogenated isoprene-based(meth)acrylate, epoxy (meth)acrylate, and a (meth)acrylic group-containing acrylic polymer, and among these, a urethane (meth)acrylate having a polybutadiene skeleton, a urethane (meth)acrylate having a hydrogenated polybutadiene skeleton, a urethane (meth)acrylate having a castor oil skeleton, an isoprene-based(meth)acrylate, and a hydrogenated isoprene-based(meth)acrylate are preferable from the viewpoint of excellent compatibility with the (A) component and the (B) component of the present invention. In the present invention, the "oligomer" refers to a compound having a structure with a repeating unit of a monomer in the main chain and consisting of 2 to 100 repeating units. In addition, these may be used singly or in combinations of two or more.

To the curable resin composition of the present invention, an inorganic filler may be added to such an extent that the storage stability is not impaired, for the purpose of improving the elastic modulus, the fluidity, or the like of the cured product. Specific examples thereof include an inorganic powder and a metallic powder. Examples of the inorganic powder filler include glass, fumed silica, alumina, mica, a ceramic, silicone rubber powder, calcium carbonate, aluminum nitride, carbon powder, kaolin clay, a dry clay mineral, and dry diatomaceous earth. The amount of the inorganic powder blended is preferably about 0.1 to 100 parts by mass per 100 parts by mass of the (A) component.

Fumed silica can be blended for the purpose of adjusting the viscosity of the curable resin composition or improving the mechanical strength of the cured product. Preferably, those subjected to hydrophobization treatment with an organochlorosilane, a polyorganosiloxane, hexamethyldisilazane, or the like can be used. Specific examples of fumed silica include a commercially available product such as trade name AEROSIL (R) R974, R972, R972V, R972CF, R805, R812, R812S, R816, R8200, RY200, RX200, RY200S, or R202 manufactured by Nippon Aerosil Co., Ltd.

An antioxidant may be added to the curable resin composition of the present invention. Examples of the antioxidant include a quinone-based compound such as β-naphthoquinone, 2-methoxy-1,4-naphthoquinone, methylhydroquinone, hydroquinone, hydroquinone monomethyl ether, mono-tert-butylhydroquinone, 2,5-di-tert-butylhydroquinone, p-benzoquinone, 2,5-diphenyl-p-benzoquinone, or 2,5-di-tert-butyl-p-benzoquinone; a phenol-based compound such as phenothiazine, 2,2-methylene-bis(4-methyl-6-tert-butylphenol), catechol, tert-butyl catechol, 2-butyl-4-hydroxyanisole, 2,6-di-tert-butyl-p-cresol, 2-tert-butyl-6-(3-tert-butyl-2-hydroxy-5-methylbenzyl)-4-methylphenyl acrylate, 2-[1-(2-hydroxy-3,5-di-tert-pentylphenyl)ethyl]-4,6-di-tert-pentylphenyl acrylate, 4,4'-butylidenebis(6-tert-butyl-3-methylphenol), 4,4'-thiobis(6-tert-butyl-3-methylphenol), 3,9-bis[2-[3-(3-tert-butyl-4-hydroxy-5-methylphenyl)propionyloxy]-1,1-dimethylethyl]-2,4,8,10-tetraoxaspiro[5,5]undecane, pentaerythritol tetrakis[3-(3,5-di-tert-butyl-4-hydroxyphenyl)propionate], thiodiethylenebis[3-(3,5-di-tert-butyl-4-hydroxyphenyl)propionate], octadecyl-3-(3,5-di-tert-butyl-4-hydroxyphenyl)propionate, N,N'-hexane-1,6-diylbis[3-(3,5-di-tert-butyl-4-hydroxyphenyl)propionamide], benzenepropanoic acid, 3,5-bis(1,1-dimethylethyl)-4-hydroxy-C7-C9 side chain alkyl ester, 2,4-dimethyl-6-(1-methylpentadecyl)phenol, diethyl [[3,5-bis(1,1-dimethylethyl)-4-hydroxyphenyl]methyl]phosphonate, 3,3',3",5,5',5"-hexa-tert-butyl-a,a',a"-(mesitylene-2,4,6-tolyl)tri-p-cresol, calcium diethylbis[[3,5-bis(1,1-dimethylethyl)-4-hydroxyphenyl]methyl]phosphonate, 4,6-bis(octylthiomethyl)-o-cresol, ethylenebis(oxyethylene)bis[3-(5-tert-butyl-4-hydroxy-m-tolyl)propionate], hexamethylenebis[3-(3,5-di-tert-butyl-4-hydroxyphenyl) propionate, 1,3,5-tris(3,5-di-tert-butyl-4-hydroxybenzyl)-1,3,5-triazine-2,4,6(1H,3H,5H)-trione, 1,3,5-tris[(4-tert-butyl-3-hydroxy-2,6-xylyl)methyl]-1,3,5-triazine-2,4,6(1H, 3H,5H)-trione, a reaction product of N-phenylbenzenamine and 2,4,6-trimethylpentene, 2,6-di-tert-butyl-4-(4,6-bis(octylthio)-1,3,5-triazin-2-ylamino)phenol, picric acid, or citric acid; a phosphorus compound such as tris(2,4-di-tert-butylphenyl) phosphite, tris[2-[[2,4,8,10-tetra-tert-butyldibenzo[d,f][1,3,2]dioxaphosphepin-6-yl]oxy]ethyl] amine, bis(2,4-di-tert-butylphenyl)pentaerythritol diphosphite, bis[2,4-bis(1,1-dimethylethyl)-6-methylphenyl] ethyl ester phosphorous acid, tetrakis(2,4-di-tert-butylphenyl)[1,1-bisphenyl]-4,4'-diylbisphosphonite, or 6-[3-(3-tert-butyl-4-hydroxy-5-methylphenyl)propoxy]-2,4, 8,10-tetra-tert-butyldibenzo[d,f][1,3,2]dioxaphosphepin; a sulfur-based compound such as dilauryl 3,3'-thiodipropionate, dimyristyl 3,3'-thiodipropionate, distearyl 3,3'-thiodipropionate, pentaerythrityl tetrakis(3-laurylthiopropionate), or 2-mercaptobenzimidazole; an amine-based compound such as phenothiazine; a lactone-based compound; and a vitamin E-based compound. Among these, a phenol-based compound is suitable.

A light stabilizer may be added to the curable resin composition of the present invention. Examples of the light stabilizer include a hindered amine-based compound such as bis(2,2,6,6-tetramethyl-4-piperidyl)sebacate, bis(1,2,2,6,6-pentamethyl-4-piperidyl)sebacate, 4-benzoyloxy-2,2,6,6-tetramethylpiperidine, 1-[2-[3-(3,5-di-tert-butyl-4-hydroxyphenyl)propionyloxy]ethyl]-4-[3-(3,5-di-tert-butyl-4-hydroxyphenyl)propionyloxy]-2,2,6,6-tetramethylpiperidine, 1,2,2,6,6-pentamethyl-4-piperidinylmethacrylate, bis(1,2,2,6,6-pentamethyl-4-piperidinyl)[[3, 5-bis(1,1-dimethylethyl)-4-hydroxyphenyl]methyl] butylmalonate, decanedioic acid bis(2,2,6,6-tetramethyl-1 (octyloxy)-4-piperidinyl) ester, a reaction product of 1,1-dimethylethyl hydroperoxide and octane, N,N',N",N"'-tetrakis-(4,6-bis-(butyl-(N-methyl-2,2,6,6-tetramethylpiperidin-4-yl)amino)-triazin-2-yl)-4,7- diazadecane-1,10-diamine, a polycondensate of dibutylamine/1,3,5-triazine/N,N'-bis(2,2,6,6-tetramethyl-4-piperidyl-1,6-hexamethylenediamine and N-(2,2,6,6-tetramethyl-4-piperidyl)butylamine, poly[[6-(1,1,3,3-tetramethylbutyl)amino-1,3,5-triazine-2,4-diyl][(2,2,6,6-tetramethyl-4-piperidyl)imino]hexamethylene[(2,2,6,6-tetramethyl-4-piperidyl)imino]], a polymer of dimethyl succinate and 4-hydroxy-2,2,6,6-tetramethyl-1-piperidine ethanol, 2,2,4,4-tetramethyl-20-(β-lauryloxycarbonyl)ethyl-7-oxa-3,20-diazadispiro[5.1.11.2]heneicosan-21-one, β-alanine, N-(2,2,6,6-tetramethyl-4-piperidinyl)-dodecyl ester/tetradecyl ester, N-acetyl-3-dodecyl-1-(2,2,6,6-tetramethyl-4-piperidinyl)pyrrolidine-2,5-dione, 2,2,4,4-tetramethyl-7-oxa-3,20-diazadispiro[5,1,11,2]heneicosan-21-one, 2,2,4,4-tetramethyl-21-oxa-3,20-diazadicyclo-[5,1,11,2]-heneicosane-20-propanoic acid dodecyl ester/tetradecyl ester, propanedioic acid, [(4-methoxyphenyl)-methylene]-bis(1,2,2,6,6-pentamethyl-4-piperidinyl) ester, a higher fatty acid ester of 2,2,6,6-tetramethyl-4-piperidinol, 1,3-benzenedicarboxamide, or N,N'-bis(2,2,6,6-tetramethyl-4-piperidinyl); a benzophenone-based compound such as octabenzone; a benzotriazole-based compound such as 2-(2H-benzotriazol-2-yl)-4-(1,1,3,3-tetramethylbutyl)phenol, 2-(2-hydroxy-5-methylphenyl)benzotriazole, 2-[2-hydroxy-3-(3,4,5,6-tetrahydrophthalimido-methyl)-5-methylphenyl] benzotriazole, 2-(3-tert-butyl-2-hydroxy-5-methylphenyl)-5-chlorobenzotriazole, 2-(2-hydroxy-3,5-di-tert-pentylphenyl)benzotriazole, a reaction product of methyl 3-(3-(2H-benzotriazol-2-yl)-5-tert-butyl-4-hydroxyphenyl)propionate and polyethylene glycol, or 2-(2H-benzotriazol-2-yl)-6-dodecyl-4-methylphenol; a benzoate-based compound such as 2,4-di-tert-butylphenyl-3,5-di-tert-butyl-4-hydroxybenzoate; and a triazine-based compound such as 2-(4,6-diphenyl-1,3,5-triazin-2-yl)-5-[(hexyl)oxy]phenol. A hindered amine-based compound is particularly preferable.

An adhesion-imparting agent may be added to the curable resin composition of the present invention. Examples of the adhesion-imparting agent include 3-methacryloxypropylmethyldimethoxysilane, 3-methacryloxypropyltrimethoxysilane, 3-methacryloxypropylmethyldiethoxysilane, 3-methacryloxypropyltriethoxysilane, acryloxypropyltrimethoxysilane, methacryloxyoctyltrimethoxysilane, vinyltrimethoxysilane, vinyltrichlorosilane, vinyltriethoxysilane, vinyl-tris(β-methoxyethoxy)silane, γ-chloropropyltrimethoxysilane, β-(3,4-epoxycyclohexyl)ethyltrimethoxysilane, γ-glycidoxypropyltrimethoxysilane, γ-mercaptopropyltrimethoxysilane, γ-aminopropyltriethoxysilane, N-β-(aminoethyl)-γ-aminopropyltrimethoxysilane, N-β-(aminoethyl)-γ-aminopropylmethyldimethoxysilane, γ-ureidopropyltriethoxysilane, hydroxyethyl methacrylate phosphate, methacryloxyoxyethyl acid phosphate, methacryloxyoxyethyl acid phosphate monoethylamine half salt, and 2-hydroxyethyl methacrylic acid phosphate. Among these, hydroxyethyl methacrylate phosphate, methacryloxyoxyethyl acid phosphate, methacryloxyoxyethyl acid phosphate monoethylamine half salt, 2-hydroxyethyl methacrylic acid phosphate, and the like are preferable. The content of the adhesion-imparting agent is preferably 0.05 to 30 parts by mass, and further preferably 0.2 to 10 parts by mass, per 100 parts by mass of the (A) component.

The curable resin composition of the present invention is preferably one not containing an organic solvent from the viewpoint of small repellence when the curable resin composition is applied to an adherend by screen printing while maintaining the tensile strength of the cured product. The organic solvent means an organic compound that is liquid at 25° C., other than the silicone compound, the (B) component, the (C) component, and the (D) component, and examples thereof include propylene glycol and diisobutyl ketone.

The viscosity at 25° C. of the curable resin composition of the present invention is not particularly limited, and is, for example, 0.1 Pa·s or more, preferably 0.2 Pa·s or more, more preferably 0.5 Pa·s or more, further preferably 1 Pa·s or more, particularly preferably 2 Pa·s or more, and, for example, 100 Pa·s or less, preferably 50 Pa·s or less, more preferably 20 Pa·s or less, from the viewpoint of workability and the like. A particularly preferable viscosity is 10 Pa·s or less. Unless otherwise specified, viscosity measurement was carried out using a cone-plate type viscometer, and viscosity at 25° C. was measured.

The curable resin composition of the present invention can be produced by a conventionally known method. For example, the curable resin composition can be produced by blending predetermined amounts of the (A) component to the (C) component and mixing these using mixing means such as a mixer at a temperature of preferably 10 to 70° C. for preferably 0.1 to 5 hours. In addition, the curable resin composition is preferably produced in a light-shielded environment.

<Application Method>

As a method for applying the curable resin composition of the present invention to an adherend, a method such as dispensing, spraying, inkjet, screen printing, gravure printing, dipping, or spin coating can be used as an automatic application machine, and among these, the curable resin composition of the present invention is most suitable for screen printing because the curable resin composition exerts the effect of eliminating an air bubble generated during screen printing. The curable resin composition of the present invention is preferably liquid at 25° C. from the viewpoint of applicability.

<Curing Method>

The light source for curing the curable resin composition of the present invention by irradiating the same with light such as ultraviolet light or visible light is not particularly limited, and examples thereof include a low-pressure mercury lamp, a medium-pressure mercury lamp, a high-pressure mercury lamp, an ultra-high pressure mercury lamp, a black light lamp, a microwave-excited mercury lamp, a metal halide lamp, a sodium lamp, a halogen lamp, a xenon lamp, an LED, a fluorescent lamp, sunlight, and an electron beam irradiation apparatus. The dosage of light irradiation is preferably 3 kJ/m$^2$ or more, and more preferably 5 kJ/m$^2$ or more, from the viewpoint of the properties of the cured product, and is preferably 100 kJ/m$^2$ or less, more preferably 80 kJ/m$^2$ or less, and particularly preferably 60 kJ/m$^2$ or less, from the viewpoint of the tact time in the curing step.

<Cured Product>

The cured product of the present invention is obtained by curing the curable resin composition of the present invention by irradiating the same with an ultraviolet ray according to the above curing method. The cured product of the present invention can be obtained by any curing method as long as the curable resin composition of the present invention is cured.

<Use and Sealing Agent>

A use for which the curable resin composition of the present invention or a cured product thereof is suitably used is a curable sealing agent. In the present invention, the sealing agent also includes a use such as an adhesive, a coating agent, a casting agent, or a potting agent. For use in such a use, the curable resin composition of the present invention is preferably liquid at 25° C.

The curable resin composition of the present invention or a cured product thereof is a rubber elastic body excellent in low gas permeability (gas barrier property), low moisture permeability, heat resistance, acid resistance, flexibility, and the like, and thus examples of a specific use of the sealing agent include a fuel cell, a solar cell, a dye-sensitized solar cell, a lithium ion battery, an electrolytic capacitor, a liquid crystal display, an organic EL display, an electronic paper, an LED, a hard disk drive, a photodiode, and an optical communication/circuit, an electric wire/cable/optical fiber, an optical isolator, a laminated body such as an IC card, a sensor, a substrate, and a pharmaceutical/medical device/instrument. The curable resin composition of the present invention is rapidly cured by irradiation with an active energy ray such as an ultraviolet ray, and has an excellent gas barrier property, and thus among the above uses, a fuel cell use is particularly preferable.

<Fuel Cell>

A fuel cell is a power generator that produces electricity by chemically reacting hydrogen and oxygen. In addition, there are four types of fuel cells: a polymer electrolyte fuel cell, a phosphoric acid fuel cell, a fused carbonate fuel cell, and a solid oxide fuel cell, and among these, the polymer electrolyte fuel cell has a relatively low operating temperature (around 80° C.) but high power generation efficiency and thus is used for a use such as a power source for an automobile, a power generator for a home, a compact power source for an electronic device such as a cellphone, or an emergency power source.

Figure 2:
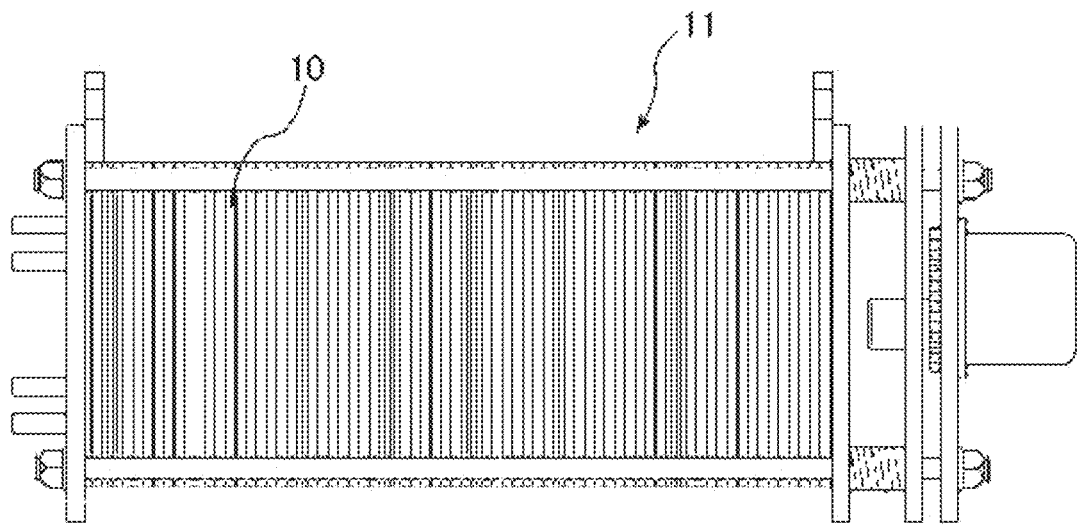
FIG. 2 is a schematic diagram showing the whole of a fuel cell.

As shown in FIG. 1, a cell 1 of a representative polymer electrolyte fuel cell has a structure including an electrolyte membrane electrode assembly (MEA) 5 having a structure in which a polymer electrolyte membrane 4 is sandwiched between an air electrode 3a and a fuel electrode 3b, a frame 6 that supports the MEA, and a separator 2 in which a gas flow path is formed. In addition, when starting up the polymer electrolyte fuel cell, a fuel gas (hydrogen gas) and an oxidation gas (oxygen gas) are supplied through an oxidation gas flow path 8a and a fuel gas flow path 8b. In addition, cooling water flows through a flow path 9 for the purpose of mitigating heat generation during power generation. A package obtained by stacking several hundred cells is referred to as a cell stack 10 as shown in FIG. 2.

When a fuel gas (hydrogen gas) is supplied to a fuel electrode and an oxidation gas (oxygen gas) is supplied to an oxygen electrode (air electrode), the following reaction occurs at each electrode, and on the whole, a reaction that produces water ($H_2 + 1/2 O_2 \rightarrow H_2O$) occurs. To describe it in detail, as described below, a proton (H+) generated at the fuel electrode diffuses through the solid polymer membrane and moves to the oxygen electrode side, and water ($H_2$) generated by reaction of the proton with oxygen is discharged from the oxygen electrode side.

Fuel electrode (anode electrode): $H_2 \rightarrow -2H^+ + 2e^-$

Oxygen electrode (cathode electrode): $1/2 O_2 + 2H^+ + 2e^- \rightarrow H_2O$

In order to start up the polymer electrolyte fuel cell, it is necessary to separately supply a hydrogen-containing fuel gas to the anode electrode and an oxygen-containing oxidation gas to the cathode electrode with these gases isolated from each other. This is because if the isolation is insufficient and one gas mixes with the other gas, the power generation efficiency may decrease. Against this background, a sealing agent is often used for the purpose of preventing leakage of a fuel gas, an oxidation gas, or the like. Specifically, a sealing agent is used between adjacent separators, between a separator and a frame, between a frame and an electrolyte membrane or an MEA, or the like.

An example of the polymer electrolyte membrane is a cation exchange membrane having ion conductivity, and a preferable example is a fluorine-based polymer having a sulfonic acid group in that it is chemically stable and resistant to operation at a high temperature. Examples of a commercially available product thereof include Nafion (R) manufactured by DuPont, FLEMION (R) manufactured by AGC Inc., and Aciplex (R) manufactured by Asahi Kasei Corporation. Usually, the polymer electrolyte membrane is difficult to adhere, but can be adhered by using the curable resin composition of the present invention.

[Formula 4]

Nafion (R)

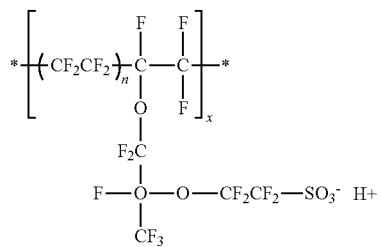

The fuel electrode is referred to as a hydrogen electrode or an anode, and a known one is used. For example, one having a catalyst such as platinum, nickel, or ruthenium supported on carbon is used. In addition, the air electrode is referred to as an oxygen electrode or a cathode, and a known one is used. For example, one having a catalyst such as platinum or an alloy supported on carbon is used. The surface of each electrode may include a gas diffusion layer that serves to diffuse a gas and to retain moisture in the electrolyte. A known material is used as the gas diffusion layer, and examples thereof include carbon paper, carbon cloth, and carbon fiber.

As shown in FIG. 1, the separator 2 has flow paths having fine irregularities through which a fuel gas and an oxidation gas pass and are supplied to the electrodes. In addition, the separator is made of aluminum, stainless steel, titanium, graphite, carbon, or the like.

The frame supports and reinforces the electrolyte membrane or the MEA, which is a thin membrane, so that the electrolyte membrane or the MEA is not broken. Examples of the material of the frame include a thermoplastic resin such as polyvinyl chloride, polyethylene naphthalate, polyethylene terephthalate, polypropylene, or polycarbonate. In addition, in order to bond members together using the curable resin composition of the present invention or a cured product thereof, the frame is preferably made of a material that transmits light.

The fuel cell of the present invention is a fuel cell characterized by being sealed using the curable resin composition of the present invention or a cured product thereof. Examples of a member that requires sealing in a fuel cell include a separator, a frame, an electrolyte membrane, a fuel electrode, an air electrode, and an MEA. Examples of a more specific sealing location include one between adjacent separators, one between a separator and a frame, and one between a frame and an electrolyte membrane or an MEA. The main purpose of sealing "between a separator and a frame" or "between a polymer electrolyte membrane or an MEA and a frame" is to prevent gas mixing and leakage, and the purpose of sealing between adjacent separators is to prevent gas leakage and to prevent cooling water from leaking outside from the cooling water flow path. The acid generated from the electrolyte membrane produces a strong acid atmosphere, and thus the sealing is required to have acid resistance.

<Sealing Method>

The sealing method using the curable resin composition of the present invention is not particularly limited, and representative examples thereof include FIPG (form-in-place gasketing), CIPG (cure-in-place gasketing), MIPG (mold-in-place gasketing), and liquid injection molding.

FIPG is a method involving applying the curable resin composition of the present invention to a flange of a part to be sealed using an automatic application apparatus or the like, and irradiating the curable resin composition with an active energy ray such as an ultraviolet ray from the flange side that is permeable to light, in the state of the flange being bonded to another flange, to cure the curable resin composition to adhere and seal the flanges. More specifically, the method is a sealing method for sealing at least a portion between at least two flanges of a part to be sealed having the at least two flanges, wherein at least one of the flanges is permeable to an active energy ray, the sealing method including: a step of applying the above curable resin composition to a surface of at least one flange of the flanges; a step of bonding the one flange (application surface) to which the curable resin composition is applied and another flange together via the curable resin composition; and a step of irradiating the curable resin composition with an active energy ray through the flange that is permeable to the active energy ray to cure the curable resin composition to seal at least a portion between the at least two flanges.

CIPG is a method involving bead-applying the curable resin composition of the present invention to a flange of a part to be sealed using a screen printing application apparatus, an automatic application apparatus, or the like, irradiating the curable resin composition with an active energy ray such as an ultraviolet ray to cure the curable resin composition to form a gasket, and bonding the flange and another flange together to compress and seal the flanges. More specifically, the method is a sealing method for sealing at least a portion between at least two flanges of a part to be sealed having the at least two flanges, the sealing method including: a step of applying the above curable resin composition to at least one flange of the flanges; a step of irradiating the applied curable resin composition with an active energy ray to cure the curable resin composition to form a gasket made of a cured product of the curable resin composition; and a step of disposing another flange on the gasket and crimping the one flange to which the curable resin composition is applied and the another flange via the gasket to seal at least a portion between the at least two flanges.

MIPG is a method involving pressing a mold against a flange of a part to be sealed in advance, injecting a curable resin composition into a cavity formed between the mold made of a material that is permeable to light and the flange, irradiating the curable resin composition with an active energy ray such as an ultraviolet ray to photocure the curable resin composition to form a gasket, and bonding the flange and another flange together to compress and seal the flanges. The mold is preferably made of a material that is permeable to light, and specific examples of the material include glass, polymethyl methacrylate (PMMA), polycarbonate, a cycloolefin polymer, and an olefin. In addition, in order to make it easy to remove the gasket from the mold after gasket formation, it is preferable to apply a release agent such as a fluorine-based release agent or a silicone-based release agent to the mold in advance. More specifically, the method is a sealing method for sealing at least a portion between at least two flanges of a part to be sealed having the at least two flanges, the sealing method including: a step of disposing a mold for gasket formation on at least one flange of the flanges; a step of injecting the above curable resin composition into at least a portion of a gap between the mold for gasket formation and the one flange on which the mold is disposed; a step of irradiating the curable resin composition with the active energy ray to cure the curable resin composition to form a gasket made of a cured product of the curable resin composition; a step of removing the mold from the one flange; and a step of disposing another flange on the gasket and crimping the one flange and the another flange via the gasket to seal at least a portion between the at least two flanges.

The liquid injection molding is a method involving pouring the curable resin composition of the present invention under a specific pressure into a mold made of a material that is permeable to light, irradiating the curable resin composition with an active energy ray such as an ultraviolet ray to photocure the curable resin composition to form a gasket, and bonding the flange and another flange together to compress and seal the flanges. The mold is preferably made of a material that is permeable to light, and specific examples of the material include glass, PMMA, polycarbonate, a cycloolefin polymer, and an olefin. In addition, in order to make it easy to remove the gasket from the mold after gasket formation, it is preferable to apply a release agent such as a fluorine-based release agent or a silicone-based release agent to the mold in advance.

EXAMPLES

The present invention will be described in more detail with reference to Examples below, but the present invention is not limited to these Examples.

<Production of a1>

Production of polyisobutylene having acryloyloxyethoxyphenyl group (a1)

The inside of a 5 L separable flask was purged with nitrogen, then 200 mL of n-hexane and 2000 mL of butyl chloride were added, and the resulting mixture was cooled to −70° C. in a nitrogen atmosphere with stirring. Next, 840 mL (9 mol) of isobutylene, 12 g (0.05 mol) of p-dicumyl chloride and 1.1 g (0.012 mol) of 2-methylpyridine were added. After the reaction mixture was cooled to −70° C., 5.0 mL (0.05 mol) of titanium tetrachloride was added to initiate polymerization. Three hours after the initiation of polymerization, 40 g of phenoxyethyl acrylate (Light Acrylate PO-A, manufactured by Kyoeisha Chemical Co., Ltd.) and 110 ml of titanium tetrachloride were added. After that, after continuing stirring at −70° C. for 4 hours, 1000 ml of methanol was added to terminate the reaction.

The supernatant liquid was separated from the reaction solution and the solvent and the like were distilled off, then the product was dissolved in 3000 ml of n-hexane, washed with 3000 ml of pure water three times, and reprecipitated from methanol, then the solvent was distilled off under reduced pressure, and the resulting polymer was vacuum-dried at 80° C. for 24 hours to obtain a polyisobutylene having an acryloyloxyethoxyphenyl group (a1).

The a1 contains a —[$CH_2C(CH_3)_2$]— unit and contains two acryloyl groups. More specifically, a1 is a polymer represented by the general formula (1) wherein $R^1$ represents a dicumyl group, PIB represents a polyisobutylene skeleton, $R^4$ represents a hydrocarbon group having 2 carbon atoms, $R^2$ and $R^3$ each independently represent a hydrogen atom, and $R^5$ is a hydrogen atom. The number average molecular weight (chromatographic method, in terms of polystyrene) of the a1 component was 11,100, and the viscosity (25° C.) of the a1 component was 1550 Pa·s.

<Preparation of Curable Resin Composition>

Example 1

100 parts by mass of the polyisobutylene having an acryloyloxyethoxyphenyl group (a1) as the (A) component of the present invention, 7.8 parts by mass of bis(2,4,6-trimethylbenzoyl)-phenyl-phosphine oxide (manufactured by IGM Resins B. V., Omnirad 819) as (b1) of the (B) component of the present invention, 0.9 parts by mass of an antifoaming agent (BYK-1799 manufactured by BYK-Chemie GmbH, kinematic viscosity (25° C.): 158 mm$^2$/s) containing no organic solvent and containing a silicone compound having none of a methoxysilyl group, an ethoxysilyl group, and a (meth)acryloyl group and a hydrophobic solid as (c1) of the (C) component, 65 parts by mass of isobornyl acrylate (IBX-A manufactured by Kyoeisha Chemical Co., Ltd.) as (d1) of the (D) component, and 22 parts by mass of lauryl acrylate (L-A manufactured by Kyoeisha Chemical Co., Ltd.) as (d2) were added, and these was mixed using a planetary mixer under light shielding at normal temperature (25° C.) for 60 minutes to obtain Example 1, which was a curable resin composition containing no organic solvent.

Example 2

Example 2 containing no organic solvent was prepared and obtained in the same manner as in Example 1, except that in Example 1, the amount of the (c1) component was changed from 0.9 parts by mass to 1.8 parts by mass.

Example 3

Example 3 containing no organic solvent was prepared and obtained in the same manner as in Example 1, except that in Example 1, the amount of the (c1) component was changed from 0.9 parts by mass to 3.6 parts by mass.

Example 4

Example 4 containing no organic solvent was prepared and obtained in the same manner as in Example 1, except that in Example 1, dimethylpolysiloxane capped with trimethylsilyl groups at both terminals containing no organic solvent and having none of a methoxysilyl group, an ethoxysilyl group, and a (meth)acryloyl group (KF-96-100cs manufactured by Shin-Etsu Chemical Co., Ltd., kinematic viscosity (25° C.): 100 mm$^2$/s) was used as the (c2) component instead of the (c1) component.

Comparative Example 1

Comparative Example 1 containing no organic solvent was prepared and obtained in the same manner as in Example 1, except that in Example 1, (c1) was omitted.

Comparative Example 2

Comparative Example 2 containing no organic solvent was prepared and obtained in the same manner as in Example 1, except that in Example 1, an antifoaming agent containing no organic solvent and containing an organic polymer that was not a silicone compound (BYK-1790 manufactured by BYK-Chemie GmbH) was used as a (c'1) component instead of the (c1) component.

Comparative Example 3

Comparative Example 3 containing an organic solvent was prepared and obtained in the same manner as in Example 1, except that in Example 1, an antifoaming agent containing diisobutyl ketone as an organic solvent and containing a silicone compound having none of a methoxysilyl group, an ethoxysilyl group, and a (meth)acryloyl group (BYK-066N manufactured by BYK-Chemie GmbH) was used as a (c'2) component instead of the (c1) component.

Comparative Example 4

Comparative Example 4 containing an organic solvent was prepared and obtained in the same manner as in Example 1, except that in Example 1, an antifoaming agent containing propylene glycol as an organic solvent and containing a silicone compound having none of a methoxysilyl group, an ethoxysilyl group, and a (meth)acryloyl group (BYK-067A manufactured by BYK-Chemie GmbH) was used as a (c'3) component instead of the (c1) component.

Comparative Example 5

Comparative Example 5 containing no organic solvent was prepared and obtained in the same manner as in Example 1, except that in Example 1, a silicone oligomer containing no organic solvent and having an acryloyl group and a methoxy group in a side chain (KR-513 manufactured by Shin-Etsu Chemical Co., Ltd.) was used as a (c'4) component instead of the (c1) component.

The test methods used in the Examples and the Comparative Examples in Table 1 are as follows. "-" in the table means being unmeasured.

(1) Evaluation of Repellability During Screen Printing

Each curable resin composition was applied by printing onto a polytetrafluoroethylene sheet using a SUS mesh screen printing plate having an opening of 110 μm in a 25° C. environment using a manual squeegee. It was visually checked whether or not each curable resin composition was repelled on the polytetrafluoroethylene sheet. Results are summarized in Table 1. The evaluation was such that the rating "Pass" was given when there was no repellence on the polytetrafluoroethylene sheet, and the rating "Fail" was given when there was clear repellence.

Polytetrafluoroethylene has a surface tension equivalent to that of the electrolyte membrane.

(2) Evaluation of Antifoaming Property During Screen Printing

Each curable resin composition was applied by printing onto a polytetrafluoroethylene sheet using a SUS mesh screen printing plate having an opening of 110 μm in a 25° C. environment using a manual squeegee. After that, the time required for an air bubble to disappear from the printed layer (thickness: 50 μm) made of the curable resin composition was visually checked and was used as the antifoaming time (seconds). In addition, time measurement was started immediately after application by printing. Results are summarized in Table 1. The antifoaming time is preferably within 60 seconds, more preferably within 50 seconds, and particularly preferably within 40 seconds, from the viewpoint of line tact.

(3) Measurement of Hardness

The thickness of each curable resin composition is set to 1 mm, and the composition is cured by irradiating the composition with an ultraviolet ray having an integrated light quantity of 45 kJ/m² to manufacture a sheet-shaped cured product. While keeping the impression surface of a type A durometer (hardness tester) parallel to a test piece (six sheet-shaped cured products stacked and set to a thickness of 6 mm), the impression surface is pressed with a force of 10 N to bring the impression surface and the sample into close contact. The maximum value is read at the time of measurement, and the maximum value is defined as the "hardness." Details comply with JIS K 6253 (2012). The hardness is preferably 15 or more, and more preferably 20 or more.

(4) Method for Measuring Elongation Rate Of Cured Product

The thickness of each curable resin composition is set to 1 mm, and the composition is cured by irradiating the composition with an ultraviolet ray having an integrated light quantity of 45 kJ/m² to manufacture a sheet-shaped cured product. The cured product is punched using a No. 3 dumbbell to manufacture a test piece, and marked lines at an interval of 20 mm are drawn on the test piece.

The test piece is fixed to a chuck in the same manner as in the measurement of tensile strength, and pulled at a pull speed of 500 mm/min until the test piece is cut. At the time of measurement, the test piece is stretched to widen the interval between the marked lines, and thus the interval between the marked lines is measured using a vernier caliper until the test piece is cut. The proportion of elongation based on the initial marked line interval is defined as the "elongation rate (%)." Evaluation is carried out based on the following criteria, and results are shown in Table 1. The elongation rate is preferably 300% or more, and more preferably 410% or more, from the viewpoint of high elongation.

(5) Tensile Strength Measurement

The thickness of a curable resin composition is set to 1 mm, and the composition is cured by irradiating the composition with an ultraviolet ray having an integrated light quantity of 45 kJ/m² to manufacture a sheet-shaped cured product. The cured product is punched using a No. 3 dumbbell to manufacture a test piece. Both ends of the test piece are fixed to a chuck such that the long axis of the test piece and the center of the chuck are aligned. The test piece is pulled at a pull speed of 500 mm/min to measure the maximum load. The strength at the maximum load is defined as the "tensile strength (MPa)." Details comply with JIS K 6251 (2010). The tensile strength is preferably 3.9 MPa or more, and more preferably 4.2 MPa or more.

TABLE 1

| | (1) Evaluation of repellability during screen printing | (2) Evaluation of antifoaming property during screen printing (second) | (3) Hardness (A) | (4) Elongation rate (%) | (5) Tensile strength (MPa) |
|---|---|---|---|---|---|
| Example 1 | Pass | 40 | 29 | 500 | 4.2 |
| Example 2 | Pass | 20 | 29 | 575 | 5.7 |
| Example 3 | Pass | 10 | 28 | 510 | 4.4 |
| Example 4 | Pass | 40 | 30 | 581 | 5.5 |
| Comparative Example 1 | Fail | 120 | 29 | 560 | 4.6 |
| Comparative Example 2 | Fail | 120 | — | — | — |
| Comparative Example 3 | Fail | 40 | 28 | 465 | 3.5 |
| Comparative Example 4 | Fail | 30 | 29 | 500 | 3.8 |
| Comparative Example 5 | Fail | 10 | 33 | 405 | 3.6 |

According to Examples 1 to 4 in Table 1, it can be seen that the present invention is a curable resin composition that is compatible with application by screen printing while maintaining cured product properties of high strength and high elongation.

In addition, Comparative Example 1 in Table 1 is a curable resin composition not containing (c1) of the (C) component of the present invention, and had the following results: there was repellence from the adherend when applied by screen printing and the antifoaming property was inferior. In addition, Comparative Example 2 is a curable resin composition using (c'1) instead of (c1) of the (C) component of the present invention, and had the following results: there was repellence from the adherend when applied by screen printing and the antifoaming property was inferior. In addition, Comparative Examples 3 and 4 are a curable resin composition using "(c'2) or (c'3), which was an antifoaming agent containing a solvent," instead of (c1) of the (C) component of the present invention, and had the following results: there was repellence from the adherend when applied by screen printing and the tensile strength of the cured product was inferior. In addition, Comparative Example 5 is a curable resin composition using (c'4) instead of (c1) of the (C) component of the present invention, and had the following results: there was repellence from the adherend when applied by screen printing and the tensile strength and the elongation rate of the cured product were inferior.

Further, (6) viscosity measurement and (7) moisture permeability (water vapor barrier property) were evaluated as follows.

(6) Viscosity Measurement

The viscosity (Pa·s) of a curable resin composition was measured using a cone-plate type viscometer (manufactured by Brookfield) based on the following measurement conditions. Evaluation is carried out based on the following criteria, and results are shown in Table 2. The viscosity is preferably 100 Pa·s or less, more preferably 0.1 to 50 Pa·s, and particularly preferably in the range of 0.2 to 10 Pa·s.

From the results in Table 2, it was found that the viscosities of Examples 1 to 4 and Comparative Examples 1 and 3 to 5 were comparable.

[Measurement Conditions]
Cone-type CPE-52, shear rate of 10 (1/s), temperature of 25° C.

TABLE 2

|  | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|
| (6) Viscosity (Pa·s) | 5.3 | 5.5 | 5.2 | 5.5 | 5.4 | — | 4.9 | 6.4 | 5.3 |

(7) Moisture Permeability (Water Vapor Barrier Property)

The curable resin composition of Example 2 or 4 was poured into a frame of 200 mm×200 mm×1.0 mm. After that, the curable resin composition was irradiated with an ultraviolet ray for 20 seconds using an ultraviolet irradiator such that the integrated light quantity was 45 kJ/m² to prepare a sheet-shaped cured product having a thickness of 1.0 mm. 5 g of calcium chloride (anhydrous) was placed in an aluminum cup having an opening having a diameter of 30 mm, and was set in the cup in such a way as to cover the cured product. The "initial total weight" (g) was measured, then the cup was left in a constant temperature and humidity bath kept at an ambient temperature of 40° C. and a relative humidity of 95% for 24 hours, the "total weight after leaving" (g) was measured, and the moisture permeability (g/m²·24 h) was calculated and evaluated based on the following evaluation criteria. Both Examples 2 and 4 were rated as Pass. The detailed test method complied with JIS Z 0208-1976. In the case of use as a curable sealing agent for a fuel cell, the moisture permeability is preferably less than 10 g/m²·24 h.

[Evaluation Criteria]
Pass: Moisture permeability of less than 10 g/m²·24 h
Fail: Moisture permeability of 10 g/m²·24 h or more The present application is based on Japanese Patent Application No. 2020-146349 filed on Aug. 31, 2020, the disclosure of which is incorporated herein by reference in its entirety.

INDUSTRIAL APPLICABILITY

The present invention has been made in view of the above circumstances, and is a curable resin composition that is compatible with application by screen printing while maintaining cured product properties of high strength and high elongation and thus can be used for various sealing uses. In particular, the present invention is industrially useful because it is effective as a curable sealing agent for a fuel cell.

REFERENCE SIGNS LIST

1: cell of polymer electrolyte fuel cell
2: separator
3a: air electrode (cathode)
3b: fuel electrode (anode)
4: polymer electrolyte membrane
5: electrolyte membrane electrode assembly (MEA)
6: frame
7: adhesive or sealing agent
8a: oxidation gas flow path
8b: fuel gas flow path
9: cooling water flow path
10: cell stack
11: polymer electrolyte fuel cell

The invention claimed is:

1. A curable resin composition comprising the following (A) to (C) components:
   (A) component: a polyisobutylene resin comprising one or more (meth)acryloyl groups and a —[CH₂C(CH₃)₂]— unit
   (B) component: a radical polymerization initiator
   (C) component: an antifoaming agent comprising a silicone compound having none of a methoxysilyl group, an ethoxysilyl group, and a (meth)acryloyl group and not comprising an organic solvent.

2. The curable resin composition according to claim 1, wherein the (A) component is a polyisobutylene resin represented by a general formula (1):

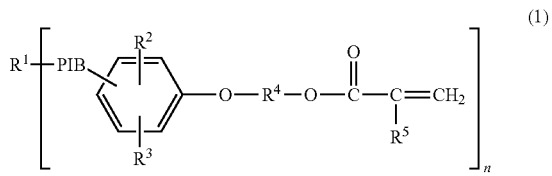

wherein R¹ represents a monovalent or polyvalent aromatic hydrocarbon group or a monovalent or polyvalent aliphatic hydrocarbon group optionally having an aromatic ring, PIB represents a polyisobutylene skeleton comprising the —[CH₂C(CH₃)₂]— unit, R⁴ represents a divalent hydrocarbon group having 2 to 6 carbon atoms optionally containing an oxygen atom, R² and R³ each independently represent a hydrogen atom or a monovalent hydrocarbon group having 1 to 20 carbon atoms, R⁵ represents a hydrogen atom, a methyl group, or an ethyl group, and n is any integer of 1 to 6.

3. The curable resin composition according to claim 1, wherein the curable resin composition comprises 0.1 to 10 parts by mass of the (C) component per 100 parts by mass of the (A) component.

4. The curable resin composition according to claim 1, wherein the curable resin composition further comprises a monofunctional monomer as a (D) component.

5. The curable resin composition according to claim 1, wherein the curable resin composition does not comprise an organic solvent.

6. The curable resin composition according to claim 1, wherein the silicone compound in the (C) component is a compound having a structure of any of dimethylsiloxane, methylphenylsiloxane, or diphenylsiloxane.

7. The curable resin composition according to claim 4, wherein the curable resin composition comprises 0.1 to 9 parts by mass of the (C) component per 100 parts by mass in total of the (A) component and the (D) component.

8. The curable resin composition according to claim 1, wherein the (B) component is a radical photopolymerization initiator or an organic peroxide.

9. A curable sealing agent for a fuel cell, comprising the curable resin composition according to claim 1.

10. The curable sealing agent for a fuel cell according to claim 9, wherein the curable sealing agent for a fuel cell is used for any member selected from the group consisting of a separator, a frame, an electrolyte membrane, a fuel electrode, an air electrode, and an electrolyte membrane electrode assembly, which are members of a fuel cell.

11. A cured product of the curable resin composition according to claim 1.

12. A fuel cell comprising any seal selected from the group consisting of a seal between adjacent separators in a fuel cell and a seal between a frame of a fuel cell and an electrolyte membrane or an electrolyte membrane electrode assembly, wherein the any seal is the cured product according to claim 11.

13. A sealing method for sealing at least a portion between at least two flanges of a part to be sealed having the at least two flanges, wherein at least one of the flanges is permeable to an active energy ray, the sealing method comprising:
   a step of applying the curable resin composition according to claim 1 to a surface of at least one of the flanges;
   a step of bonding the one flange to which the curable resin composition is applied and another flange together via the curable resin composition; and
   a step of irradiating the curable resin composition with an active energy ray through the flange that is permeable to the active energy ray to cure the curable resin composition to seal at least a portion between the at least two flanges.

14. A sealing method for sealing at least a portion between at least two flanges of a part to be sealed having the at least two flanges, the sealing method comprising:
   a step of applying the curable resin composition according to claim 1 to at least one flange of the flanges;
   a step of irradiating the applied curable resin composition with an active energy ray to cure the curable resin composition to form a gasket made of a cured product of the curable resin composition; and
   a step of disposing another flange on the gasket and crimping the one flange to which the curable resin composition is applied and the another flange via the gasket to seal at least a portion between the at least two flanges.

15. A sealing method for sealing at least a portion between at least two flanges of a part to be sealed having the at least two flanges, the sealing method comprising:
   a step of disposing a mold for gasket formation on at least one flange of the flanges;
   a step of injecting the curable resin composition according to claim 1 into at least a portion of a gap between the mold for gasket formation and the one flange on which the mold is disposed;
   a step of irradiating the curable resin composition with an active energy ray to cure the curable resin composition to form a gasket made of a cured product of the curable resin composition;
   a step of removing the mold from the one flange; and
   a step of disposing another flange on the gasket and crimping the one flange and the another flange via the gasket to seal at least a portion between the at least two flanges.

* * * * *